United States Patent [19]

Houpt et al.

[11] Patent Number: 4,561,320
[45] Date of Patent: Dec. 31, 1985

[54] TWO-WAY PAWL-RATCHET WHEEL ASSEMBLY

[75] Inventors: Grover K. Houpt, Wayne; Richard Kayros, Bristol, both of Pa.

[73] Assignee: American Manufacturing Company, Inc., King of Prussia, Pa.

[21] Appl. No.: 335,253

[22] Filed: Dec. 28, 1981

[51] Int. Cl.[4] .................. F16H 27/02; G05G 1/00
[52] U.S. Cl. ........................................ 74/128; 74/578
[58] Field of Search ............ 74/128, 146, 147, 144, 74/160, 575, 578; 192/43.2

[56] References Cited

U.S. PATENT DOCUMENTS

| | | | |
|---|---|---|---|
| 1,091,817 | 3/1914 | Dudgeon | 74/578 |
| 1,286,360 | 12/1918 | Leopold | 74/578 |
| 1,493,737 | 5/1924 | Couse | 74/128 |
| 1,748,887 | 2/1930 | Linares | 192/43.2 |
| 2,512,755 | 6/1950 | Vosper | 74/578 |
| 2,519,400 | 8/1950 | Robins et al. | 74/578 |
| 2,595,967 | 5/1952 | McCloy | 74/128 |
| 2,734,413 | 2/1956 | Dunkelberger | 192/43.2 X |
| 2,823,278 | 2/1958 | Carlson et al. | 74/128 |
| 2,980,076 | 4/1961 | Machlan et al. | 74/128 |
| 3,136,167 | 6/1964 | Morner | 74/128 |
| 3,449,973 | 6/1969 | Ytterhag | 74/128 |
| 3,817,110 | 6/1974 | Challandes | 74/128 |

OTHER PUBLICATIONS

Halliday & Resnick, Physics, John Wiley & Sons, Publisher, 1967, p. 282.

Primary Examiner—Kenneth J. Dorner
Assistant Examiner—Vinh Luong
Attorney, Agent, or Firm—Nelson E. Kimmelman

[57] ABSTRACT

An assembly which involves a ratchet wheel adapted to be rotated by incremental steps to drive a shaft connected thereto. A rotatable pushbutton is mounted through a hole in the chassis and is connected to a rod to which a flexible pawl is mounted parallel to the rod. When the pushbutton is in one rotary position, inward pressure strokes on the pushbutton cause the pawl to engage teeth in one region of the ratchet wheel causing it to move in a clockwise direction. When the pushbutton is rotated 180° to a second rotary position, each inward push on the pushbutton causes the pawl to engage respective teeth in another region of the wheel thereby moving the wheel incrementally one step in a counterclockwise direction.

7 Claims, 6 Drawing Figures

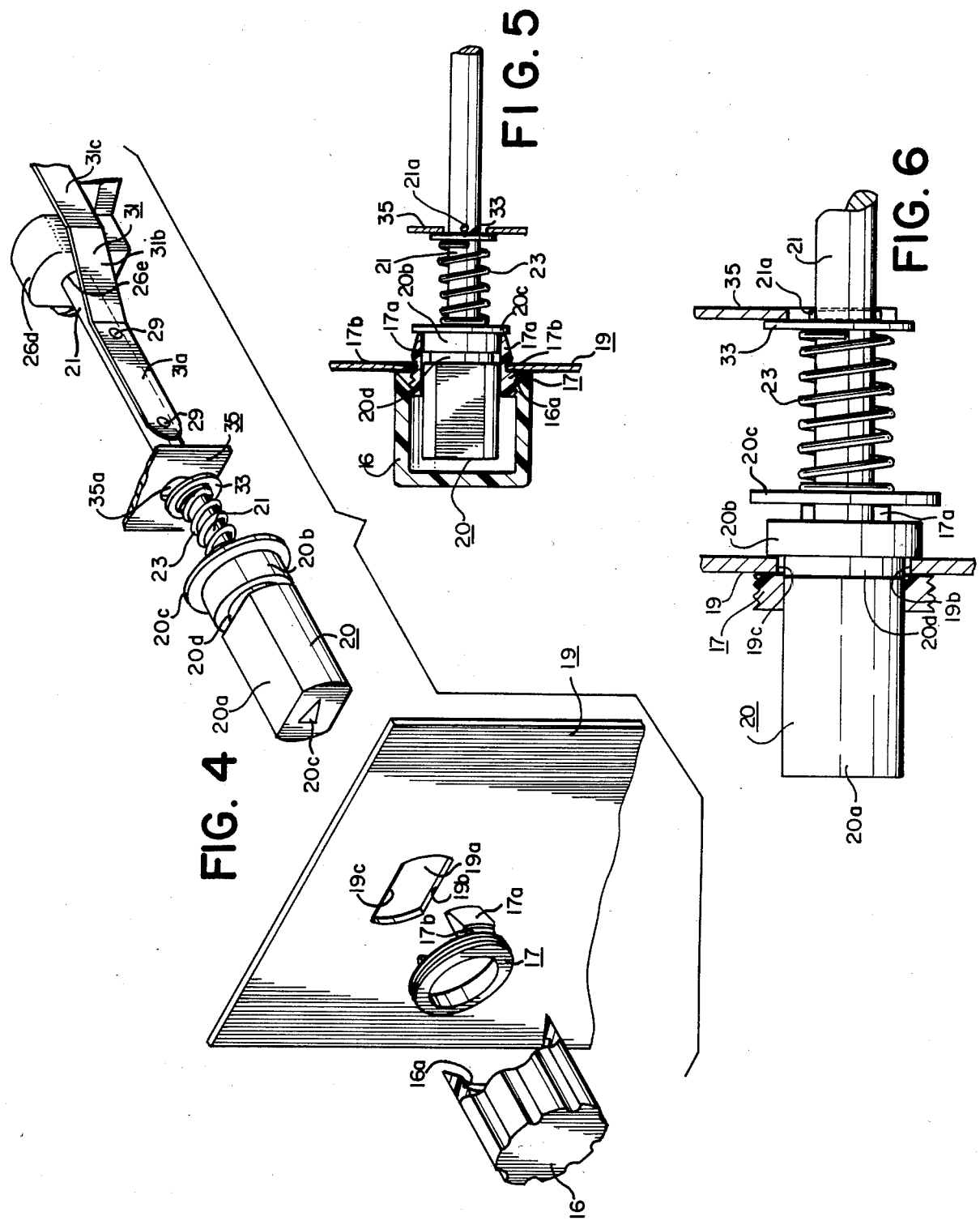

TWO-WAY PAWL-RATCHET WHEEL ASSEMBLY

BACKGROUND OF THE INVENTION

A. Field of the Invention

This invention relates generally to apparatus for rotating a wheel increment-by-increment and in particular to a pawl-ratchet wheel assembly capable of rotation of the wheel in either rotary direction.

B. Prior Art

Previous pawl-ratchet wheel assemblies designed for incremental rotation in either direction were relatively complicated and sometimes involved two pawl members. This made them unnecessarily more expensive, both from a material and labor standpoint, then they had to be.

It is therefore among the objects of the present invention to provide a relatively simple, uncomplicated and inexpensive, dual rotation pawl-ratchet wheel assembly which requires a single pushbutton and a single aperture in a housing for operation from outside the housing.

BRIEF SUMMARY OF THE INVENTION

A dual direction actuating mechanism for a ratchet wheel comprising an elongated reciprocating means capable of rotation about its axis and having a resilient finger adapted to engage said wheel at first and second different points thereon corresponding to first and second different rotary positions of said elongated means whereby said wheel may be incrementally turned in respective opposite rotary directions.

BRIEF DESCRIPTION OF THE DRAWINGS

FIG. 4 is an exploded perspective view of the present invention;

FIG. 5 is a fragmentary plan view, partly in section, of part of the present showing the pushbutton at rest; and FIG. 6 is an enlarged side elevational view, partly in section, of part of the invention showing the pushbutton pulled out to a position where it may be rotated 180°.

DETAILED DESCRIPTION OF THE DRAWINGS

Figure 1:
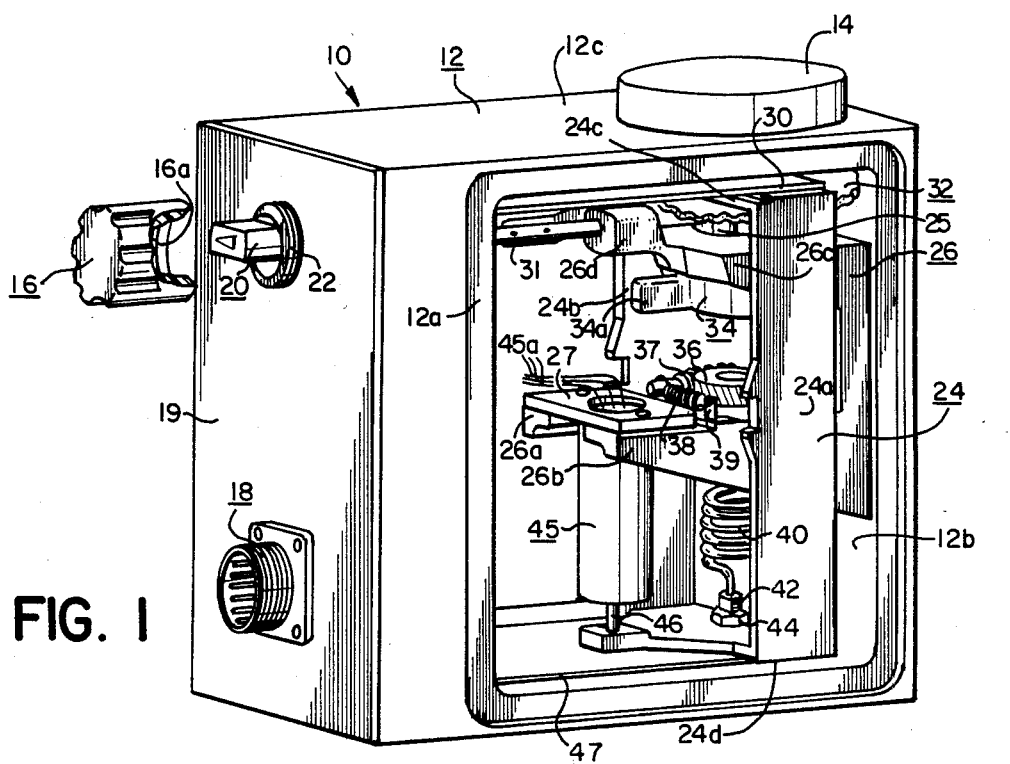
FIG. 1 is a perspective view of a weigh cell which embodies the present invention.

Referring to FIG. 1, there is shown indicated generally at the numeral 10 a weigh or load cell encased within a cast metal chassis 12. Weigh cells of this general nature have hitherto been commercially available, such as the Model 6005C cell marketed by the Automatic Timing and Controls Division of American Manufacturing Company, Inc. Through its upper surface 12c, there is mounted a metal platform 14 connected to the weighing stand or apparatus via platform 30 which is mounted by rigid means (not shown) which extend through an aperture (not shown) in 12c to a displaceable metal bracket indicated generally at the numeral 24. The bracket 24 has a generally O-shaped configuration and is attached at its top 24c and at its bottom 24d to and between the right ends of respective flexure plates 30 and 47. The respective left ends of those plates are fixedly mounted (not shown) to fixed points on the inside surface of the end wall (not shown) of the chassis 12. A load on the platform 14 causes it, its rigid linkage and the bracket-flexure plates assembly to move downward a corresponding amount against the action of spring 40.

A generally C-shaped metallic bracket 26 has its vertical portion fixedly attached to the inside surface of the end wall 12b. Bracket 26 serves several purposes: (1) it provides a fixed upper point to which the upper end of the spring 40 is fastened; (2) it provides support for a tare-adjusting mechanism comprising worm gear 36, an externally adjustable worm 37, and a spring 38 attached to the worm 37 and to anchoring means 39 on the bracket 26. Spring 38 permits worm 37 to disengage from worm gear 36 when spring 40 reaches its maximum or minimum limit; (3) it has two horizontal extensions 26a and 26b, each having an apertured metallic slab 27 fixed to it which immobilizes the top end of a differential transformer 45. The movable armature 46 of transformer 45 is fixed to a lower projecting portion 24e of the bracket 24 so that when a load is applied, movement downward of the bracket 24 will cause downward movement of the armature relative to the transformer 45. Wires 45a carry the input and output signals to and from the transformer.

Tension spring 40 has its upper end attached to a square bolt (not shown) that passes through an unthreaded aperture in bracket 26 and is screwed into the central threaded aperture of worm gear 36. The lower end of spring 40 is attached to a partially threaded member 42 retained in an aperture in the lower portion 24d of the fixed bracket 24 by two nuts 44, the top nut only being visible in FIG. 1. The spring 40 is part of the tare-adjust subassembly and cooperates with the flexure plates 30 and 46 to restore the bracket 24 and platform 14 to the non-load position after an object has been weighed whereupon the armature 46 rises to its null-point position.

To prevent oscillation, a damping sub-assembly which is shown and described in more detail in the copending application of Vernon Whittaker and Richard Kayros, Ser. No. 348,492, filed Feb. 12, 1982 and entitled "Variable Damping Subassembly for Weigh Cells", now U.S. Pat. No. 4,428,444, issued Jan. 31, 1984 is shown. It includes a dashpot cup 34 filled with viscous material, which is screwed from below into an aperture formed in part 26a of the fixed bracket. Coaxial with that cup and the aperture in which it fits, is a sprocket or ratchet wheel 32. Without getting into any of the details of that dashpot subassembly, suffice it to say that if the sprocket wheel 32 is rotated clockwise, a spool partially shown at numeral 25 which is fixed to the wheel is rotated in the same direction. This causes the lower disc-like end of the spool to be brought nearer to a coaxially mounted perforated disc. This causes the resistance to the downward movement of the perforated disc in the viscous fluid within the dash-pot cup 34 to increase. Conversely, if the sprocket or ratchet wheel 32 is rotated in a counter-clockwise direction, the lower portion of the spool moves further away from the perforated disc thereby decreasing the resistance to the movement of the perforated disc through the viscous damping medium.

It is highly desirable to be able to adjust from outside the chassis the damping action of the dashpot subassembly with fine resolution to minimize oscillation. Accordingly, in accordance with the present invention, a ratchet-pawl subassembly is employed which can with the pressing of a single pushbutton cause rotation of the ratchet wheel in either rotary direction. This subassembly comprises a pushbutton 20 made of plastic or otherwise having an outer portion 20a whose top and bottom are flats and whose sides are curved portions of a cylinder with a given radius. Outer portion 20a is integral with inner portion 20b and intermediate portion 20d.

The diameter of the intermediate portion 20d is the same as distance between the flats (FIG. 6). The radius of the inner portion 20b is identical to the radius of the curved sides of the outer portion of pushbutton 20.

The outer portion 20a passes through a similarly-sectioned aperture 19a formed in the front plate 19 of the chassis, the edges 19c and 19b of the aperture being formed to give a small clearance for the passage of the flats of the pushbutton 20. A threaded grommet-like member 17, made of plastic or the like with somewhat resilient tabs or ears 17a located at the 3 o'clock and 9 o'clock positions, respectively, is snapped into the aperture 19 from outside so that the grooves 17b of the tabs are engaged by the curved edges of the aperture 19a. The inner diameter of the grommet is the same as the left-to-right dimension of the aperture 19a.

As seen in FIG. 5, the pushbutton 20 is pushed through the aperture 19a from inside and through the grommet 17 until the washer 20c bears against the inner extremities of the tabs 17a. A spring 23 is disposed between the larger washer 20c and another smaller washer 33 all of which are mounted coaxially about a rod 21 which is normally in contact with the inner surface of the washer 33. It is evident from FIG. 4 that because of the shape of the aperture 19a and of the outer section 20a, the pushbutton 20 cannot be rotated when the latter is in the rest position shown there and in FIG. 5.

The right or inner end of the rod 21 is journalled for sliding reciprocating movement within an aperture 26e in the portion 26d of the fixed bracket. A slotted hanger 35 is located inwardly (in the housing) of washer 33 to limit the inward movement of the latter which normally is urged against it by spring 23. A resilient arm or pawl 31 made of spring steel is fastened toward the right end of rod 21 and has a flat portion 31a pinned to the rod by pins 29, an intermediate angled portion 31b and a terminal portion 31c. Cap 16 is screwed onto threaded member 17 to keep moisture and dirt from entering the interior of the chassis.

Figure 2:
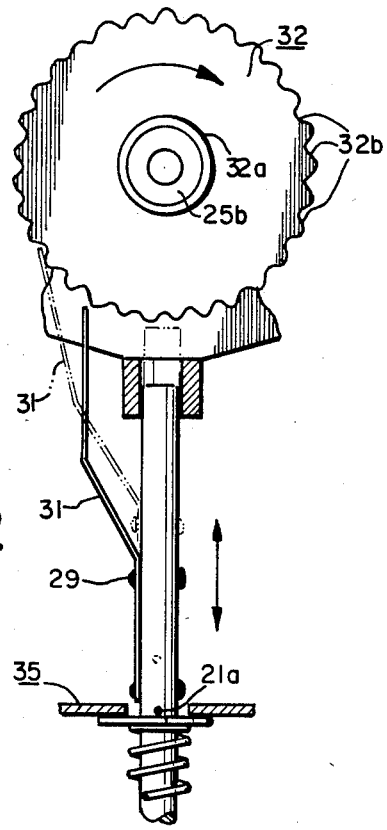
FIG. 2 is a fragmentary plan view, partly sectional, of part of the present invention corresponding to the position of the pushbutton shown in FIG. 1.

As seen in FIGS. 1 and 2, inward strokes of the pushbutton will cause the pawl 31 to engage teeth of wheel 32 to the left of the axis of rod 21 causing the wheel to rotate clockwise which increases the damping action.

When it is desired to decrease the damping action, with cap 16 removed, button 20 is pulled from the position shown in the plan view of FIG. 5 outwardly to its maximum point as shown in the side elevation of FIG. 6. In that position, it is seen that the surface of the round inner portion 20d facing plate 19 is brought into contact with the latter's inner surface 19e whereupon the portion 20d is coplanar with the aperture 19a in the plate 19. Until this condition is brought about, the button cannot be rotated due to the cross-section configuration of button portion 20a relative to that of aperture 19a. However, since the intermediate portion 20d has the same diameter as the flat-to-flat dimension of portion 20a, pushbutton 20 can now be rotated in that position.

Figure 3:
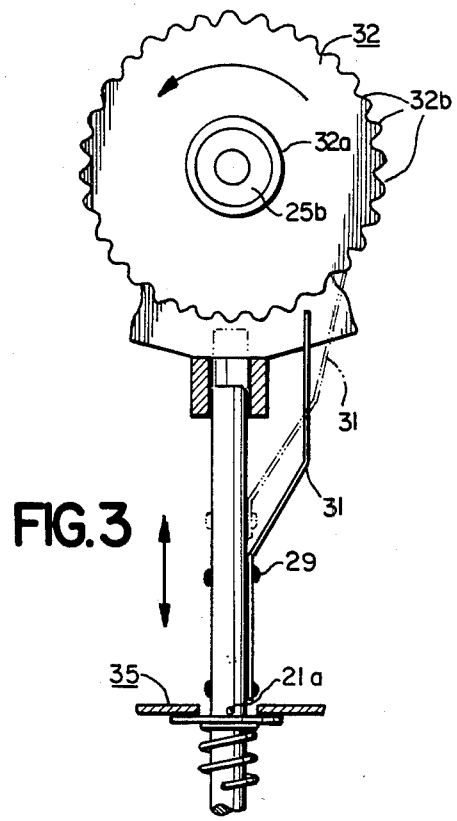
FIG. 3 is a fragmentary, partly sectional view of part of the present invention showing its operation and position when the pushbutton has been rotated 180°.

At the same time, the pin 21a also moves outwardly causing the washer 33 to compress the spring 23, the ears 17a preventing washer 20c from moving outwardly. The pushbutton indicator 20c was originally pointing in the 9 o'clock position in FIG. 1, but the operator's turn of the pushbutton 20 clockwise 180° caused it to point to the 3 o'clock position as shown in FIG. 4. In this position, which is also shown in FIG. 3, the pushbutton 20 can be released so that it is restored to the second of its normal rest positions by the decompressive action of the spring 23. By subsequent pushing on the pushbutton 20 (FIG. 3), the ratchet wheel 32 is made to rotate counter-clockwise by the engagement of the end 31c of the pawl arm with the teeth of wheel 32 in a region to the right of the axis of the rod 21 as seen in FIG. 3.

Normally, once the intiial damping of the dashpot subassembly has been set, the protruding portion of the button 20 and the pawl subassembly is sealed against moisture and dirt by screwing a cap 16 made of plastic or other material having a threaded interior onto the threads of the grommet-like member 17. A circular groove 16a formed toward the open end of the cap permits the insertion of a seal such as a compressible O-ring to increase its weather-tightness.

In this embodiment, for greater resolution of the adjustment of the damping action, the sprocket wheel 32 was designed to rotate about 3½ revolutions. Since it is mounted to a spool-like member 32a which threadedly engages an axial threaded member (not shown), the wheel 32 will move up or down as it is turned by the pawl assembly. Consequently, the width of the pawl finger 31c must be sufficient for it to engage the teeth of the wheel at its upper and lower limits as well as in between.

While the invention has been described in terms of a single pawl which is mounted so as to be rotated 180° to engage a different portion of the ratchet wheel, it should be realized that other arrangements are also possible. For example, two pawl fingers could be mounted on the rod 21, but separated 60° around the axis of the rod. The button 20 could have a hexagonal cross-section and the aperture 19a could be similarly shaped. Thus, if the button 20 were pulled outwardly and rotated 60°, the second pawl would be brought into such position that it would engage a predetermined point on the wheel. Whereas the first pawl engaged successive adjacent teeth of the wheel, the second pawl could be disposed to engage every other tooth for more rapid advancement of the wheel.

Alternatively, more than two pawl fingers could be used, e.g., three at 120° rotary spacing about the rod with a corresponding (equilateral) triangular pushbutton and triangular aperture 19a. Even four or more pawls could be employed, space permitting, with corresponding square, rectangular or other polygonal sectioned pushbuttons and apertures.

It should also be remembered that the aperture 19a and correspondingly-sectioned pushbutton is just one way of maintaining the desired positions of the pawl or pawls relative to their points of engagement with the ratchet wheel. However, many other mechanical arrangements are possible which accomplish the same objective.

We claim:

1. A two-way pawl assembly for actuation of a ratchet wheel comprising:
   (a) reciprocating means capable of rotation about its axis to first and second different rotary positions, said means having a resilient portion adapted to engage said wheel at a first point thereon when said reciprocating means is in said first rotary position and is reciprocated thereby turning said wheel by incremental steps in a first rotational direction, said reciprocating means including an elongated rigid means to which said resilient portion is attached for reciprocal movement in unison therewith, the axis of said elongated rigid means being aligned with the center of said wheel and wherein in said first rotary position said first point engaged by said resilient portion is located on a first side of a diameter of said wheel aligned with the axis of said elongated member, and (b) means enabling rotation of said reciprocating means to said second rotary position whereupon said portion is adapted to engage said wheel at a second point thereon, said second point being located on the other side of said wheel diameter, thereby turning said wheel in a second rotational direction opposite said first rotational direction, and further wherein said incremental steps correspond to the engagement of successive adjacent teeth of said wheel by said resilient portion.

2. The assembly according to claim 1 wherein said reciprocating means includes a pushbutton attached to the end of a rod and said resilient portion is a resilient finger mounted on and substantially parallel to said rod.

3. A two-way pawl assembly for actuation of a ratchet wheel comprising:

(a) reciprocating means capable of rotation about its axis to first and second different rotary positions, said means having a portion adapted to engage said wheel at a first point thereon when said reciprocating means is in said first rotary position and is reciprocated thereby turning said wheel in a first rotational direction, (b) means enabling rotation of said reciprocating means to said second rotary position whereupon said portion is adapted to engage said wheel at a second point thereon thereby turning said wheel in a second rotational direction opposite said first rotational direction, and (c) means for preventing reciprocating of said reciprocating means except when it is in either of said first or second rotary positions.

4. The assembly according to claim 3 wherein said preventing means includes a member having an aperture through which part of said reciprocating means passes, said aperture being shaped and dimensioned relative to said part so as to allow rotation of said reciprocating means only to said two positions 180° apart, said part being capable of reciprocation only in said two positions.

5. A two-way pawl assembly for actuation of a ratchet wheel comprising:

(a) pushbutton means having
(i) a first part having a predetermined non-circular first cross-section,
(ii) a second part with a second predetermined cross-section larger in at least one dimension than said second cross-section, and
(iii) a third part between said first and second parts and having a third predetermined cross-section smaller than said first and second cross-sections thereby permitting turning of said pushbutton means, (b) elongated rigid means attached coaxially to said second part, (c) means for supporting said elongated means and enabling reciprocal motions thereof upon pressure and release of pressure on said pushbutton, (d) resilient means connected to said elongated means and having a free edge adapted to engage teeth of said ratchet wheel at a first point in response to successive inward pressure on said pushbutton means whereupon said wheel is moved in a rotary direction, and (e) means for restoring said pushbutton and elongated means to a rest position in which said free edge of said resilient means does not engage said ratchet wheel, said means for restoring comprising first and second washer means and spring means between said first and second washer means, said washer means and said spring means being mounted about said elongated means, said first washer abutting the free end of said second part, and with the addition of means fixed to said elongated means which normally is in contact with the inner side of said second washer means for moving said washer outwardly and causing said spring means to be compressed upon outward movement of said pushbutton means, said spring means also being compressed upon inward movement of said pushbutton means, and further with the addition of stationary means for limiting the inward movement of said second washer means upon inward movement of said pushbutton means.

6. The pawl assembly according to claim 5 with the addition of a substantially planar member having a non-circular aperture formed therein shaped generally to conform to, but slightly larger than, said first cross-section thereby preventing axial rotation of said first part unless said pushbutton means is moved to a position in which said third part is coplanar with said aperture whereupon said pushbutton means may be reciprocated thereby enabling said resilient means to engage said ratchet means at a second point opposite said first point on an inward stroke of said pushbutton so as to move said ratchet means in the opposite rotary direction.

7. The pawl assembly according to claim 6 wherein said first part has four sides, two opposite sides of which are curved, the other two sides being substantially planar and parallel, wherein said second part is substantially cylindrical and has a radius substantially identical to the radius of the curved sides of said first part so that portions of said second part are higher and lower than said opposing planar surfaces of said first part, and wherein said third part is substantially cylindrical and has a radius smaller than the smallest dimension of said aperture.

* * * * *